United States Patent [19]

Snodgrass

[11] Patent Number: 4,893,412
[45] Date of Patent: Jan. 16, 1990

[54] WEAPON SIGHTING STRUCTURE

[76] Inventor: Robert E. Snodgrass, 33 Sleepy Hollow Rd., Andover, Sussex County, N.J. 07821

[21] Appl. No.: 293,156

[22] Filed: Jan. 3, 1989

Related U.S. Application Data

[63] Continuation of Ser. No. 340, Jan. 5, 1987, abandoned, which is a continuation of Ser. No. 92,731, Aug. 24, 1987, abandoned.

[51] Int. Cl.$^4$ .............................................. G02B 27/32
[52] U.S. Cl. .................................................... 33/247
[58] Field of Search ................. 33/245, 246, 247, 248, 33/249, 250; 350/567

[56] References Cited

U.S. PATENT DOCUMENTS

| | | | |
|---|---|---|---|
| 2,087,996 | 7/1937 | Rarey | 33/248 |
| 2,948,188 | 8/1960 | Kollmorgen | 33/246 |
| 3,161,716 | 12/1964 | Burris | 33/246 |
| 3,374,544 | 3/1968 | Pitchford | 33/247 |
| 3,588,255 | 6/1971 | Alexander | 33/290 X |
| 3,642,341 | 2/1972 | Seifried | 33/248 |
| 3,992,782 | 11/1976 | Rickert | 33/247 |
| 4,200,355 | 4/1980 | Williams | 33/246 |
| 4,554,745 | 11/1985 | Repa | 33/248 |

Primary Examiner—Harry N. Haroian
Attorney, Agent, or Firm—Robert P. Gibson; Edward Goldberg; Michael C. Sachs

[57] ABSTRACT

A sighting structure for a weapon such as a rifle, which can hold its alignment to precision, despite repeated recoil of the weapon, is disclosed. The sighting structure is suspended in an elastomer, within a housing, and the sight alignment can be adjusted from outside the housing over two planes by vertical and horizontal set screws. The housing also serves to protect what might be a delicate instrument sight from the elements, by the possibility of enclosing it within the housing, and also providing transparent or opaque end pieces for the housing.

2 Claims, 3 Drawing Sheets

WEAPON SIGHTING STRUCTURE

GOVERNMENTAL INTEREST

The invention described herein may be made, used or licensed by or for the Government for governmental purposes without the payment to me of any royalties thereon.

CONTINUING APPLICATION

This application is a continuation of application Ser. No. 000,340, filed Jan. 5, 1987, now abandoned, which is a continuation of application Ser. No. 092,731, filed on Aug. 24, 1987, now abandoned.

BACKGROUND OF THE INVENTION

This invention pertains to a means of attachment or mounting of optical sights on rifles, hand-held weapons, or the like. In such cases rough handling, impact or vibration are environmental considerations which change the positional alignment of the sights. Maintaining the alignment of the sights is a continuing problem in such firearms which to date, lacks an adequate solution. Of especial interest are the problems encountered in alignment despite high recoil, acceleration, and possibly rough handling which can change the alignment of the sights or sighting system with respect to the bore. Further problems with sighting systems to be solved hereby concern errors in existing means for adjusting sights which employ mechanical means often having play of several thousandths of an inch. However, even these small values of play can translate into excessive dispersion. There is an accuracy problem upon recoil for the subsequent shots therefore. In the stress of combat, readjustments are hardly ever possible, so a more reliable and rugged sighting structure is therefore required to meet the combat environment.

Clearly then, any arrangement that can both accurately adjust gun sights for alignment, exactly, despite high physical shock, recoil and/or serve to protect the sights, would certainly be a great advance in this art.

BRIEF SUMMARY OF THE INVENTION

Improvement over the above mentioned and other difficulties is accomplished by embedding in an elastomer substance, a tubing which will contain the weapon's sights. Not only does the elastomer substance in this arrangement cause the tubing (which mounts the sights) to rebound to its original alignment prior to firing, each time even over hundreds of firings, but the elastomer it will be seen also protects the often delicate sight instruments from damage during firings, rough handling and forces which could be in the hundreds of G's loading. Because of the resilient nature of the said elastomer in which the tubing containing the sights is suspended, alignment can be adjusted over at least two planes by loosening or tightening vertical or horizontal adjustment screws which are provided. The elastomer in one embodiment, is a rubber which fills a housing means forming a sleeve around and supporting the tubing means which is centrally within the housing means therein. The rubber is attached to both tubing exterior and housing interior. In another embodiment, the elastomer can take the form of separate rubber bushings which are glued both to the tubing and to the inside of the housing, to contain the said tubing. Within the tubing are contained the gun sights, as was explained earlier.

Construction of the sight system includes the outer housing capable of being rigidly mounted to the weapon in manner well known to the art. The elastomer has physical properties such as to maintain and return the tubing (with sights) to be deflected from its natural position, within the housing, compressing the elastomer under the tubing (elongating the elastomer on the opposite side), to provide elevation and deflection adjustments allowing the optical center, retical or aperture, to be adjusted to the weapon and ammunition point of impact. The elastomer provides spring-like tension or loading against the elevation and deflection adjustments to maintain the optical instrument or sight in a repeatable manner.

The outer housing, plus tubing and elastomer, also provide the advantage of protecting the more delicate sights from damages or impact, since now they are well enclosed where usually they had been exposed. The elastomer also supports the sights and insulates them against shock, recoil and vibration, even beyond providing spring tension against locating points for elevation and deflection adjustments. Most elastomers considered, can lend themselves to casting or injection molding providing simple, low cost, and well known fabrication and assembly methods. When molded, the rubber needs no gluing since it adheres to the metal housing interior, and tubing exterior, as was mentioned earlier.

Provision of elevation and deflection adjustments in the mounting system of note, also enable the use of a less-sophisticated, lower cost optical instrument or sight with the same excellent results, further yielding heretofore unattainable economies. The sights also can be better sealed against environmental changes since everything is now enclosed and transparent end pieces can even be used to seal the tubing at its ends, for further protection.

OBJECTS OF THE INVENTION

Accordingly, one object of this invention is to provide means for attaching the aligning sights for firearms.

Another object of this invention is to provide a gun sight or other alignment means for a firearm which retains its alignment despite large forces and vibration occasioned through firing.

A still further object of this invention is to provide a gunsight whose alignment may be adjusted over two planes and maintain accurate alignment.

Other objects and advantages of the invention will become apparent from a reading of the attached specification and drawings, in which:

LIST OF FIGURES

DETAILED DESCRIPTION OF THE INVENTION

Figure 1:
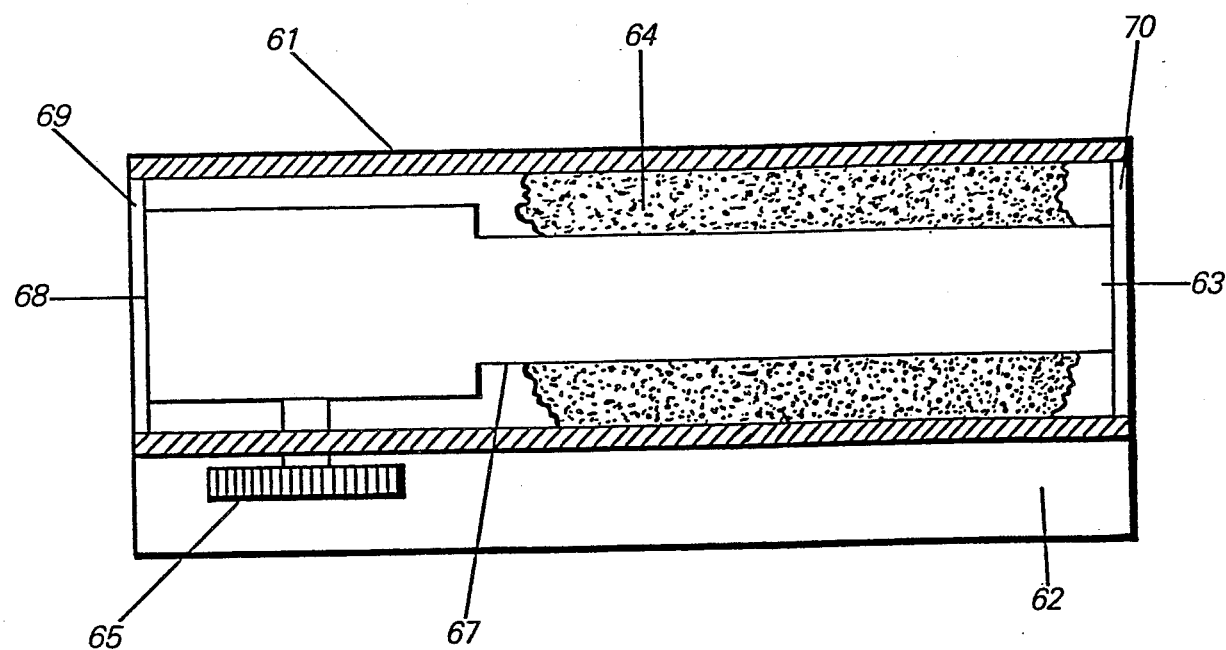
FIG. 1 shows a cross-sectional view of a telescopic sight according to this invention.
Figure 2:
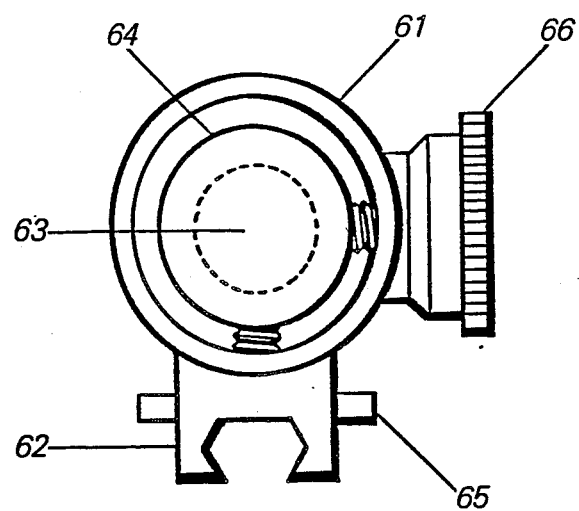
FIG. 2 shows a front view of the telescopic sight shown in FIG. 1.

In FIG. 1, a telescope 63 having a (tubing) body 67 and an aperture 68, is embedded in an elastomer 64, which in turn is mounted within an outer housing 61. As shown in the end view in FIG. 2, the housing 61 can be mounted on a base mount 62 to fit over an elongated spine protruding from the upper surface of a weapon, here a rifle is used as an exemplary weapon. In this embodiment, the alignment of the telescope as it sits within the housing may be adjusted over two planes by tightening an elevation adjustment 65 for the vertical, and a windage adjustment 66 for the horizontal. Using this arrangement on a rifle, despite a shock of what could be hundreds of G's, the telescope returns to its exact original position set prior to firing, even after firing hundreds of rounds.

The optical instrument or sight will be assembled into the outer housing suspended in and supported by a viscous polymer, RTV (room temperature vulcanizing silicone rubber) or an elastomer of sufficient physical properties to return the optical instrument or sight in a repeatable manner after each recoil impulse. The elastomer substance must also be such to enable however the optical instrument or sight to be deflected from its neutral position to provide elevation and deflection adjustments. This will allow the optical center or the line of sight to be adjusted to the weapon and ammunition point of impact. The elastomer may provide spring like tension or loading against the elevation and deflection adjustments to maintain the optical instrument or sight in a repeatable manner. In one embodiment the elastomer takes the shape of a pair of rubber bushings at opposite ends of, e.g., a telescopic sight means the bushings being glued to both the inside of the housing and also to the telescope.

There is also envisioned the making of an oversized housing (as to length) for enclosing the instrument-elastomer, etc. and parts, yet while having protective (transparent or opaque) end pieces 69, 70, e.g. These inexpensive yet effective pieces will be protective of the enclosed instruments from the elements as explained above, including heat, even possibly radiation, moisture, tampering, including damage of the sights from dropping of the rifle, e.g. or damage of another instrument used in place of the telescope, like a night vision system for instance. Of course, these elements ( which could be plexiglass material for example) must be positioned far enough back to clear all anticipated horizontal movement of the telescope, lest they be pierced or broken. However, even if damaged they are still inexpensive enough to replace; may even be made to simply screw in, or onto, e.g. the housing 61. The housing it will be understood, will be attached solidly to the rifle, or larger base, welded directly, or even attached through detachable means making simply a line replaceable part out of the entire system of this invention. Many sturdy materials can be used for a housing, depending on the economies of production, availability of materials, or type of hazard addressed for protecting the telescope or other internal instrument; one useful material for the housing is fiberglass.

Most of the delicate machine parts formerly needed with sight movements on calibrated carriages it will be seen are basically no longer needed. One could go to even cruder telescopes now, which are no longer mounted on elaborate (click type adjustable) calibrated sliding means that had to be precision machined at high costs. The plural screw means of this invention are quite capable now of a fine adjustment (even up to 15 arc seconds), and it is found that the system yet returns to its original alignment, following a number of firings. Certain precision elements formerly necessary for sights, no longer are. Yet, with this invention there is a greater superior performance of these in maintaining positions despite the lower manufacturing costs.

The screw (adjustment) means may include a ratchet like assembly, even ball bearings and heavy duty, precision thread bolts.

The selection of a proper material for the elastomer is now discussed. A review of the physical properties attainable and available in elastomers, viscous polymers, RTV (room temperature vulcanizing silicone rubbers) were found to be virtually unlimited. Hardness, for instance, ranges from a fatty flesh softness used in breast implants and prothesis, to the rigidity found in golf balls. Useful properties are; temperature ranges from $-175°$ to over $400°$ F., tensile strength upward of 500 lbs./in.$^2$, tear and bonding strength 15 to 40 lbs./in.$^2$, elongation 100 to 500% and shrinkage 0.2–0.6%. Most are two part compounds easily pourable or can be molded and assembled with adhesives. Some start for use in powder form, which is heated to melt into plastic or rubber-like material. The chemical resistance of these materials are equal to or better than some of the hard plastics utilized in small arms. The material is chosen according to the properties needed, a wide variety is possible.

Figure 3:
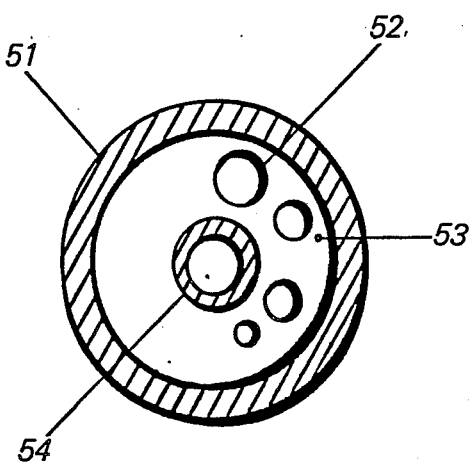
FIG. 3 shows a cross-section of one possible embodiment of the elastomer.

The type of elastomer here employed is made of viscous polymer, foam rubber, yet it is stressed that there are many other types of materials, adhesives, and physical arrangements possible for use here in exemplary FIG. 1, which fit the above mentioned descriptions as to elasticity and compressibility, elastic (or compression) limit, strength of the glue bond, e.g., even compatibility of the glue to the rubber and metal. It is even possible to dispense with the glue, as it is also envisioned to pour in molten rubber-like material of the proper type to fill in the space between the universal tube and housing (leaving room for the screws and adjustments of course) where the type of material will cling to the metal surfaces upon hardening, with sufficient strength to withstand the anticipated shocks without ripping free. In the example of FIG. 3, bushings 53 have "swiss cheese"-like holes on one hemispherical side of center axis, where the most compression of the bushing in use is anticipated, to aid in a successful compression. This is one particular embodiment of many which has been envisioned, here believed useful for savings in rubber material and better life to the rubber. However, it is even possible to use pure or foam rubber, or just a rubber bladder, e.g. which could be inflated by gas, even hydraulically and to mechanically displace the elastomer, e.g., by elliptical cams, levers, screw threads, pneumatically or hydraulically. Alternatively, the instrument could be also be suspended in a fluid that would not allow horizontal (or other) displacement under a short timed, impulse of force, such as in a rifle recoil; the action compared to that taking place in an automobile shock absorber for instance. If a thick enough fluid were used, with piston-like action plates for suspending the instrument, the instrument could either be prevented from moving under impulse or at least immediately return to its previous alignment. FIG. 3 shows a possible embodiment where the elastomer 53 has "swiss-cheese"-like holes on one hemispherical side of the axis where the most compression on the elastomer is anticipated to aid in a successful compression which also saves on rubber material and adds more life to the elastomer.

The telescope of FIG. 1 could be replaced by any like tubing wherein gun sights can be mounted in the ends thereof, and the invention would work in the same way. Thus, it is not limited to a telescope alone, but to any type sights when placed in a tubing which tubing is suspended by the elastomer. In fact, the tubing may not even contain sights at all, but could comprise for example a night-vision, or any other desired device where the advantages of this invention could be appreciated (dependable alignment despite physical shock, vibration; and protection in general of delicate instruments in shock and vibration environments).

The advantages found herein include as follows: a gun sight, either optical or metallic, e.g., can be constructed with a ruggedness heretofore unattainable. A less sophisticated, lower cost optical instrument (possibly non-metallic) can be used and protected. State of the art fabrication technology, stampings, castings or molds can be used in production, for efficient mass-production. Reduction of tolerances and elimination of small complex sub-assemblies possible with this invention now create an extremely producible assembly that will have significant impact in reducing cost. Production of both optical and metallic sights in the same configuration are now possible because of this tube within housing set-up for example which permits use with any type of sights placed in the tube. A commonality of parts and the same silhouette are seen to be now provided. Sight adjustments could have the same values, placement and direction thus reducing the training of soldiers now needed in use of rifles and weapons, for instance. Also, this invention can now provide what users have hoped for; an adjustable sight base, yet minus the shortcomings of mechanical hinges in two planes which is a part of common adjustable mounting devices for sighting weapons. Adjustments for windage and elevation can be provided in the desired direction; up is up, right moves right concept. This invention is not limited to the field of weapons alone, or even just to sighting structures, but rather can be applied in any apparatus where an instrument needs to retain its alignment despite what could be substantial physical shock; and/or to mount a delicate instrument so that it is protected from substantial physical shock, from exposure to the elements, even from light or radiation; where it is desired to adjust the alignment of an instrument accurately even within an enclosure, or even simply as a handy mounting structure for objects, having universal application and adaptability. Mounting of some instruments used for outer space flight is also a possible application.

Although the invention may have been described with regard to one particular embodiment or embodiments, many other substitutions and modifications to this invention, as will be recognized by those skilled in the art, are also included herein as though fully set forth.

What is claimed is:

1. A sighting structure for a rifle wherein said rifle has a barrel with defined barrel longitudinal axis, said structure comprisng:

telescope means for sighting, having a defined telescope longitudinal axis;

open-ended hollow cylindrical housing means for loosely enclosing said telescope means, and for holding said telescope means so that the longitudinal axes of said telescope and barrel means are completely aligned or are essentially parallel;

singular rubber sleeve means within said housing means along at least two-thirds of the full length of said telescope and surrounding said telescope means as a sleeve which is firmly attached to both the inside of the said housing means and to the outside of the telescope means;

first adjustment screw adapted in a first hole in said housing means so that said first screw engages said telescope means for displacing it in a first direction at will by tightening said first screw, or in the reverse said first direction by loosening said first screw, respectively, such displacement of the telescope by tightening causing compression of said rubber sleeve between the telescope and the inside surface of said housing;

second adjustment screw adapted in a second hole in said housing means so that said second screw engages said telescope means for displacing it in a second direction at will by respectively tightening said second screw, or in the reverse said second direction by loosening said second screw, respectively, such first and second direction being essentially orthogonal to one another, displacement of said telescope by said second screw tightening also causing compression of said rubber sleeve between the telescope and the inside surface of said housing; and whereby the sighting direction of said telescope may be adjusted to an original setting by said first and second screws to suit an operator so that it sights essentially in the direction the rifle is pointing, wherein the combination alone of said rubber sleeve under compression and the barriers created by said first and second screws alone, as adjusted, provide for holding the telescope clamped in place in its said original setting position within said housing, and without any metal spring means for such setting; and whereby said original setting remains true even though the rifle undergoes one hundred shootings or otherwise experiences severe vibrations to the rifle elements including the telescope.

2. The sighting structure of claim 1 wherein said original setting remains true even though the rifle undergoes one hundred to five hundred shootings or otherwise experiences severe vibrations to the rifle elements including the telescope.

* * * * *